US008436748B2

(12) United States Patent
Mimeault et al.

(10) Patent No.: US 8,436,748 B2
(45) Date of Patent: May 7, 2013

(54) LIGHTING SYSTEM WITH TRAFFIC MANAGEMENT CAPABILITIES

(75) Inventors: Yvan Mimeault, Québec (CA); Daniel Cantin, Québec (CA)

(73) Assignee: Leddartech Inc., Québec, Quebec (CA)

( * ) Notice: Subject to any disclaimer, the term of this patent is extended or adjusted under 35 U.S.C. 154(b) by 749 days.

(21) Appl. No.: 12/664,744

(22) PCT Filed: Jun. 18, 2008

(86) PCT No.: PCT/CA2008/001161
§ 371 (c)(1),
(2), (4) Date: Dec. 15, 2009

(87) PCT Pub. No.: WO2008/154737
PCT Pub. Date: Dec. 24, 2008

(65) Prior Publication Data
US 2010/0194595 A1    Aug. 5, 2010

Related U.S. Application Data

(60) Provisional application No. 60/944,658, filed on Jun. 18, 2007.

(51) Int. Cl.
*G08G 1/07* (2006.01)
(52) U.S. Cl.
USPC ....... 340/917; 250/221; 250/559.29; 340/913
(58) Field of Classification Search ............... 340/907, 340/917, 913, 916, 919, 925; 356/4.01, 5.01, 356/615; 250/208.2, 395, 221, 336.1, 338.1, 250/559.29; 701/36, 301
See application file for complete search history.

(56) References Cited

U.S. PATENT DOCUMENTS

| 3,680,085 A | 7/1972 | Del Signore |
| 4,717,862 A | 1/1988 | Anderson |

(Continued)

FOREIGN PATENT DOCUMENTS

| CA | 2710212 | 7/2009 |
| DE | 19604338 | 7/2004 |

(Continued)

OTHER PUBLICATIONS

The Vehicule Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.

(Continued)

*Primary Examiner* — Brent Swarthout
(74) *Attorney, Agent, or Firm* — Fasken Martineau (57) ABSTRACT

The present lighting system adds detection capabilities to perceive the presence and measure the velocity of objects such as automobiles, trucks, pedestrian and other users, to lighting modules for transportation applications like traffic signal, pedestrian control, rails signal, street light, message board and speed monitoring board. For example, a Light Emitting Diode (LED) has the capability to be used as lighting source for illumination as a first function and also be pulsed or modulated as a source for the detection sub-system as a second function.

23 Claims, 9 Drawing Sheets

U.S. PATENT DOCUMENTS

| | | |
|---|---|---|
| 4,891,624 A | 1/1990 | Ishikawa et al. |
| 4,908,615 A * | 3/1990 | Bayraktaroglu ............... 340/917 |
| 4,928,232 A | 5/1990 | Gentile |
| 5,102,218 A | 4/1992 | Min et al. |
| 5,134,393 A | 7/1992 | Henson |
| 5,179,286 A | 1/1993 | Akasu |
| 5,317,311 A | 5/1994 | Martell et al. |
| 5,357,331 A | 10/1994 | Flockencier |
| 5,381,155 A | 1/1995 | Gerber |
| 5,389,921 A | 2/1995 | Whitton |
| 5,621,518 A | 4/1997 | Beller |
| 5,633,629 A | 5/1997 | Hochstein |
| 5,714,754 A | 2/1998 | Nicholas |
| 5,760,686 A | 6/1998 | Toman |
| 5,760,887 A | 6/1998 | Fink et al. |
| 5,764,163 A | 6/1998 | Waldman et al. |
| 5,777,564 A * | 7/1998 | Jones ............................ 340/917 |
| 5,805,468 A | 9/1998 | Blöhbaum |
| 5,812,249 A | 9/1998 | Johnson et al. |
| 5,828,320 A | 10/1998 | Buck |
| 5,838,116 A | 11/1998 | Katyl et al. |
| 5,889,477 A | 3/1999 | Fasterath |
| 5,896,190 A | 4/1999 | Wangler et al. |
| 5,900,826 A * | 5/1999 | Farber ........................... 340/908 |
| 5,942,753 A | 8/1999 | Dell |
| 5,995,900 A | 11/1999 | Hsiao et al. |
| 6,044,336 A | 3/2000 | Marmarelis et al. |
| 6,094,159 A | 7/2000 | Osterfeld et al. |
| 6,100,539 A | 8/2000 | Blümcke et al. |
| 6,104,314 A | 8/2000 | Jiang |
| 6,107,942 A | 8/2000 | Yoo et al. |
| 6,115,113 A | 9/2000 | Flockencier |
| 6,142,702 A | 11/2000 | Simmons |
| 6,147,624 A | 11/2000 | Clapper |
| 6,166,645 A | 12/2000 | Blaney |
| 6,259,515 B1 | 7/2001 | Benz et al. |
| 6,259,862 B1 | 7/2001 | Marino et al. |
| 6,266,609 B1 | 7/2001 | Fastenrath |
| 6,285,297 B1 | 9/2001 | Ball |
| 6,340,935 B1 | 1/2002 | Hall |
| 6,377,167 B1 | 4/2002 | Juds et al. |
| 6,404,506 B1 | 6/2002 | Cheng et al. |
| 6,411,221 B2 | 6/2002 | Horber |
| 6,417,783 B1 | 7/2002 | Gabler et al. |
| 6,426,708 B1 | 7/2002 | Trajkovic et al. |
| 6,502,011 B2 | 12/2002 | Haag |
| 6,516,286 B1 | 2/2003 | Aebischer et al. |
| 6,548,967 B1 | 4/2003 | Dowling et al. |
| 6,556,916 B2 | 4/2003 | Waite et al. |
| 6,559,776 B2 | 5/2003 | Katz |
| 6,642,854 B2 | 11/2003 | McMaster |
| 6,650,250 B2 | 11/2003 | Muraki |
| 6,665,621 B2 | 12/2003 | Drinkard et al. |
| 6,753,766 B2 | 6/2004 | Patchell |
| 6,753,950 B2 | 6/2004 | Morcom |
| 6,765,495 B1 | 7/2004 | Dunning et al. |
| 6,771,185 B1 | 8/2004 | Yoo et al. |
| 6,794,831 B2 | 9/2004 | Leeb et al. |
| 6,825,778 B2 | 11/2004 | Bergan et al. |
| 6,831,576 B2 | 12/2004 | Geiger et al. |
| 6,836,317 B1 | 12/2004 | Perger |
| 6,842,231 B2 | 1/2005 | Nourrcier et al. |
| 6,850,156 B2 | 2/2005 | Bloomfield et al. |
| 6,885,311 B2 | 4/2005 | Howard |
| 6,885,312 B1 | 4/2005 | Kirkpatrick |
| 6,917,307 B2 | 7/2005 | Li |
| 6,927,700 B1 | 8/2005 | Quinn |
| 6,946,974 B1 | 9/2005 | Racunas, Jr. |
| 7,026,954 B2 | 4/2006 | Slemmer et al. |
| 7,081,832 B2 | 7/2006 | Nelson et al. |
| 7,106,214 B2 | 9/2006 | Jesadanont et al. |
| 7,116,246 B2 | 10/2006 | Winter et al. |
| 7,119,674 B2 | 10/2006 | Sefton |
| 7,119,715 B2 | 10/2006 | Orita |
| 7,123,166 B1 | 10/2006 | Haynes et al. |
| 7,135,991 B2 | 11/2006 | Slemmer et al. |
| 7,148,813 B2 | 12/2006 | Bauer |
| 7,221,271 B2 | 5/2007 | Reime |
| 7,236,102 B2 | 6/2007 | Shimotani |
| 7,250,605 B2 | 7/2007 | Zhevelev et al. |
| 7,253,747 B2 | 8/2007 | Noguchi |
| 7,317,384 B2 | 1/2008 | Lefranc |
| 7,321,317 B2 | 1/2008 | Nath et al. |
| 7,350,945 B2 | 4/2008 | Albou et al. |
| 7,352,972 B2 | 4/2008 | Franklin |
| 7,405,676 B2 | 7/2008 | Janssen |
| 7,426,450 B2 | 9/2008 | Arnold et al. |
| 7,486,204 B2 | 2/2009 | Quintos |
| 7,527,207 B2 | 5/2009 | Acosta et al. |
| 7,554,652 B1 | 6/2009 | Babin et al. |
| 7,573,400 B2 | 8/2009 | Arnold et al. |
| 7,635,854 B1 | 12/2009 | Babin |
| 7,640,122 B2 | 12/2009 | Levesque et al. |
| 7,642,928 B2 * | 1/2010 | Hutchison .................... 340/907 |
| 7,768,427 B2 * | 8/2010 | Manor ........................ 340/933 |
| 7,777,865 B2 * | 8/2010 | Ohishi et al. .................. 356/5.1 |
| 7,895,007 B2 | 2/2011 | Levesque et al. |
| 7,917,320 B2 | 3/2011 | Levesque et al. |
| 8,242,476 B2 | 8/2012 | Mimeault et al. |
| 2003/0154017 A1 | 8/2003 | Ellis |
| 2003/0189500 A1 | 10/2003 | Lim |
| 2004/0035620 A1 | 2/2004 | McKeefery |
| 2004/0083035 A1 | 4/2004 | Ellis |
| 2005/0046597 A1 | 3/2005 | Hutchison et al. |
| 2005/0117364 A1 | 6/2005 | Rennick et al. |
| 2005/0187701 A1 | 8/2005 | Baney |
| 2005/0231384 A1 | 10/2005 | Shimotani |
| 2005/0270175 A1 | 12/2005 | Peddie et al. |
| 2006/0033641 A1 | 2/2006 | Jaupitre |
| 2006/0145824 A1 | 7/2006 | Frenzel et al. |
| 2006/0147089 A1 | 7/2006 | Han et al. |
| 2006/0149472 A1 | 7/2006 | Han et al. |
| 2006/0180670 A1 | 8/2006 | Acosta et al. |
| 2007/0018106 A1 | 1/2007 | Zhevelev et al. |
| 2007/0061192 A1 | 3/2007 | Chew |
| 2007/0090191 A1 | 4/2007 | Schnee et al. |
| 2007/0091294 A1 | 4/2007 | Hipp |
| 2007/0096943 A1 | 5/2007 | Arnold et al. |
| 2007/0205918 A1 | 9/2007 | Riesco Prieto et al. |
| 2007/0222639 A1 | 9/2007 | Giles et al. |
| 2007/0228262 A1 | 10/2007 | Cantin et al. |
| 2007/0255525 A1 | 11/2007 | Lee et al. |
| 2008/0006762 A1 | 1/2008 | Fadell et al. |
| 2008/0172171 A1 | 7/2008 | Kowalski |
| 2008/0309914 A1 | 12/2008 | Cantin et al. |
| 2009/0256911 A1 * | 10/2009 | Hakki et al. .................. 348/149 |
| 2009/0299631 A1 | 12/2009 | Hawes et al. |
| 2010/0191418 A1 | 7/2010 | Mimeault et al. |
| 2010/0194595 A1 | 8/2010 | Mimeault et al. |
| 2010/0277713 A1 | 11/2010 | Mimeault |
| 2010/0309024 A1 | 12/2010 | Mimeault |
| 2011/0134249 A1 | 6/2011 | Wood et al. |

FOREIGN PATENT DOCUMENTS

| | | |
|---|---|---|
| DE | 102004035856 | 3/2005 |
| DE | 102006025020 | 11/2007 |
| DE | 202008007078 | 10/2008 |
| DE | 102009013841 | 9/2009 |
| EP | 0318260 | 5/1989 |
| EP | 0476562 | 3/1992 |
| EP | 0494815 | 12/1996 |
| EP | 0838695 | 4/1998 |
| EP | 0612049 | 9/1998 |
| EP | 0988624 | 3/2000 |
| EP | 0912970 | 4/2000 |
| EP | 1034522 | 9/2000 |
| EP | 0798684 | 1/2001 |
| EP | 0779990 | 3/2003 |
| EP | 0935764 | 3/2003 |
| EP | 1296302 | 3/2003 |
| EP | 0789342 | 6/2003 |
| EP | 0784302 | 9/2003 |
| EP | 0866434 | 6/2004 |
| EP | 1521226 | 6/2006 |
| EP | 1049064 | 9/2006 |
| EP | 1048961 | 7/2009 |
| EP | 1224632 | 12/2009 |

| | | |
|---|---|---|
| EP | 2136550 | 12/2009 |
| EP | 1435036 | 1/2010 |
| EP | 1611458 | 4/2010 |
| EP | 1997090 | 9/2010 |
| FR | 2690519 | 10/1993 |
| GB | 2264411 | 8/1993 |
| GB | 2354898 | 7/2003 |
| GB | 2431498 | 4/2007 |
| GB | 2445767 | 7/2008 |
| JP | 2002059608 | 2/1990 |
| JP | 2004102889 | 4/2004 |
| JP | 2006172210 | 6/2006 |
| WO | 8705138 | 8/1987 |
| WO | 9203808 | 3/1992 |
| WO | 9634252 | 10/1996 |
| WO | 9904378 | 1/1999 |
| WO | 0139153 | 5/2001 |
| WO | 0215334 | 2/2002 |
| WO | 03007269 | 1/2003 |
| WO | 2004100103 | 11/2004 |
| WO | 2006044758 | 4/2006 |
| WO | 2006092659 | 9/2006 |
| WO | 2007071032 | 6/2007 |
| WO | 2007096814 | 8/2007 |
| WO | 2008037049 | 4/2008 |
| WO | 2008154737 | 12/2008 |
| WO | 2009013739 | 1/2009 |
| WO | 2009087536 | 7/2009 |
| WO | 2009104955 | 8/2009 |
| WO | 2009117197 | 9/2009 |
| WO | 2011077400 | 6/2011 |

OTHER PUBLICATIONS

U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm.

Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.

United States Department of Transportation, Federal Highway Administration, Sensor Technology—Chapter 2, Traffic Detector Handbook : Third Edition—vol. 1, FHWA-HRT-06-108, available at http://www.tfhrc.gov/its/pubs/06108/02a.htm on Sep. 16, 2009.

The Vehicle Detector Cleaninghouse, A Summary of Vehicle Detection and Surveillance Technologies used in Intelligent Transportation Systems, Nov. 30, 2000, available at http://www.fhwa.dot.gov/environment/airtoxicmsat/4.htm on Sep. 16, 2009.

United States Department of Transportation, Federal Highway Administration, Department of Environment, Air Quality, Air Toxic MSAT,4.0. Monitoring Methods available at http://www.fhwa.dot.gov/ohim/tvtw/vdstits.pdf on Jul. 3, 2007.

United States Department of Transportation, Research and Innovative Technology Administration, 5.3. Infrared Dectectors, available at http://ntl.bts.gov/DOCS/96100/ch05/body_ch05_03.html on Sep. 16, 2009.

Kon Tayfun, Thesis, Collision Warning and Avoidance System for Crest Vertical Curves, Virginia Tech, May 4, 1998, Appendix B2, pp. 51-92, published on Digital Library and Archives, University Libraries of Virginia Tech, available at http://scholar.lib.vt.edu.theses/available/etd-43098-201311/unrestricted/APPENDIX-B2.PDF on Sep. 16, 2009.

Lawrence A. Klein, Vehicle Detector Technologies for Traffic Management Applications, Part 1, Colorado Department of Transportation, Intelligent Transportation Systems (ITS), 1997, available at http://www.cotrip.org/its/
ITS%20Guidelines%20Web%20New%20Format%202-05/
Web%20Solutions%20Packages/
Its%20Solution%20Packages%20-%20Web%20Copy/
Vehicle%20Detectors/
Klein%20Part%201%20Vehicle%20Detector%20Technologies.doc on Sep. 16, 2009.

Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT........85H on Sep. 16, 2009.

Dimitri Loukakos, Active Laser infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.

Peter J. Yauch, Transportation Research Board, Traffic signal control equipment : state of the art, published in 1990 in NCHRP Synthesis of Highway Practice No. 166, 49 pages, ISBN 0-309-04917-2.

Geneq Inc., Passive Infrared Detector for Traffic Data Acquisition, Model IR 250, Department of Meteorology, available at http://www.geneq.com/catalog/en/ir250.html on Sep. 16, 2009.

Akindinov et al., "Detection of Light Pulses Using an Avalanche-Photodiode Array with a Metal-Resistor-Semiconductor Structure", Instruments and Experimental Techniques, Nov. 2004, vol. 48, No. 3 205, pp. 355-363, Russia.

Braun et al., "Nanosecond transient electroluminescence from polymer lightemitting diodes", Applied Physics Letters Dec. 1992, vol. 61, No. 26, pp. 3092-3094, California.

* cited by examiner

LIGHTING SYSTEM WITH TRAFFIC MANAGEMENT CAPABILITIES

CROSS-REFERENCE TO RELATED APPLICATION

This patent application claims priority on U.S. Provisional Application No. 60/944,658, filed on Jun. 18, 2007.

FIELD OF THE APPLICATION

The present application relates to lighting systems, and more particularly to a lighting system providing traffic management capabilities by the control of the light output of the lighting system.

BACKGROUND OF THE APPLICATION

Growth in transportation demand causes traffic congestion. The impact of congestion represents inefficient use of fuel and hours of delay. Intelligent Transportation Systems (ITS) using advanced technologies have the potential to increase traffic efficiency of the existing facilities.

Advanced Management Transportation Systems (ATMS) rely on traffic data from different kinds of detectors divided into two categories: intrusive and non-intrusive. One type of intrusive detectors involves inductive loop detectors that are still a common technology for detecting vehicles even if that technology has disadvantages such as lengthy disruption to the traffic flow during installation and maintenance, relatively high cost, high failure rate and inflexibility. Other detectors, like cameras with video processing, also have their limitations and the market is still searching for alternatives to inductive loops.

Information from sensors is the base point in the optimization of traffic management, particularly adaptive timing for traffic light signalling. Well managed adaptive timing can result in reductions of fuel consumption, fewer vehicle emissions and a reduction in waste of time. However, sensor mounting requirements are often costly and cause traffic disruption during installation.

SUMMARY

It is an object of the present application to provide a novel lighting system detecting objects and particles for traffic management.

It is a further object of the present application to provide a novel method for detecting objects and particles in traffic management.

The present lighting system adds detection capabilities to perceive the presence and measure the velocity of objects such as automobiles, trucks, pedestrian and other users, to lighting modules for transportation applications like traffic signal, pedestrian control, rails signal, street light, message board and speed monitoring board. For example, a Light Emitting Diode (LED) has the capability to be used as lighting source for illumination as a first function and also be pulsed or modulated as a source for the detection sub-system as a second function. Other light sources, such as lasers, can be integrated into the lighting system and used as a source for the detection sub-system.

In accordance with a first aspect, there is provided a method for controlling traffic signalling, comprising: providing a traffic light with a visible-light source emitting visible light and having a function of actuating alternately at least two different traffic signal states for traffic signalling; driving the visible-light source to emit light in a traffic signal state in a predetermined mode, with visible light in the predetermined mode being emitted so as to be visible to an unaided human eye; receiving a reflection/backscatter of the emitted visible light from an object; identifying at least one of a presence and a position of the object as a function of the reflection/backscatter received and of the predetermined mode; and controlling said traffic signal states actuated by the visible-light source as a function of the at least one of the presence and the position of the object.

Further in accordance with the first aspect, the method comprises retrofitting an existing traffic light with a source controller for driving the visible-light source and a detector for receiving the reflection/backscatter of the emitted visible light from the object.

Further in accordance with the first aspect, driving the visible-light source in the predetermined mode comprises at least one of pulsating and modulating the visible light.

Further in accordance with the first aspect, receiving the reflection/backscatter comprises filtering given light wavelengths.

Further in accordance with the first aspect, identifying at least one of a presence and a position of the object comprises calculating at least a distance of the object by measuring a time delay between emitting the visible light and receiving the reflection/backscatter from the object.

Further in accordance with the first aspect, calculating the distance comprises continuously calculating the distance so as to calculate a speed of the object.

Further in accordance with the first aspect, the method comprises providing an auxiliary light source in association with the traffic light; driving the auxiliary light source concurrently with the visible-light source in another predetermined mode to emit auxiliary light; receiving a reflection/backscatter of the auxiliary light from an object; identifying at least one of the presence and the position of the object as a function of at least the reflection/backscatter received from the auxiliary light and the predetermined modes; and controlling said signal states actuated by the visible-light source as a function of at least one of the presence and the position of the object.

Further in accordance with the first aspect, driving the auxiliary light source comprises driving the auxiliary light source into emitting light non-visible to an unaided human eye.

Further in accordance with the first aspect, driving the visible-light source to emit visible light in a predetermined mode comprises pulsating a light emission diode to produce light pulses having a width of less than 50 ns.

Further in accordance with the first aspect, controlling said traffic signal states comprises switching said traffic signal states as a function of the at least one of the presence and the position of the object.

In accordance with a second aspect, there is provided a traffic-signal lighting system comprising: a light source emitting visible light and having a function of emitting visible light in an illumination mode for actuation alternately at least two traffic signal states; a source controller for driving the light source into emitting one of the traffic signal states in a predetermined mode with visible light in the predetermined mode being emitted such that the light source maintains said function of emitting traffic signals visible to an unaided human eye in the environment while being driven by the source controller; an optical detector adapted to detect the visible light as reflected/backscattered by an object to produce detection data; and a data/signal processor for receiving detection data from the optical detector, the data/signal processor producing a data output associated to the object as a function of the predetermined mode and the detection data, and for commanding the light source into controlling said traffic signal states as a function of the data output.

Further in accordance with the second aspect, the traffic-signal lighting system comprises an external traffic-management system connected to the data/signal processor for managing traffic as a function of the detection data received from the data/signal processor.

Further in accordance with the second aspect, the optical detector comprises a plurality of sub-detectors each detecting a specific zone.

Further in accordance with the second aspect, the traffic-signal lighting system comprises a scanning mechanism in association with the optical detector so as to cause a scanning motion of a field of view of the optical detector within a range of illumination of emitted light of the light sources.

Further in accordance with the second aspect, the optical detector has an array of sub-detectors.

Further in accordance with the second aspect, the source controller comprises a pulse/modulation driver to drive the visible-light source in the predetermined mode.

Further in accordance with the second aspect, the source controller comprises an illumination driver to drive the light source into emitting light of suitable intensity to illuminate an environment.

Further in accordance with the second aspect, the light source has a plurality of lights, with at least one of the lights of the light source being driven by the illumination driver to illuminate the environment, while at least another one of the lights of the light source is driven by the pulse/modulation driver to emit the visible light in the predetermined mode.

Further in accordance with the second aspect, the optical detector has a filtering device to filter given light wavelengths of the reflected/backscattered visible light.

Further in accordance with the second aspect, the traffic-signal lighting system comprises an auxiliary light source for emitting an auxiliary light in another predetermined mode concurrently with the visible-light source, the reflection/backscatter of the auxiliary light received from an object being used to produce said a data output associated to the object.

Further in accordance with the second aspect, the auxiliary light source comprises a non-visible light source.

Further in accordance with the second aspect, said light source comprises a light emitting diode light source.

Further in accordance with the second aspect, the data/signal processor commands the light source into switching said traffic signal states as a function of the data output.

DETAILED DESCRIPTION OF THE PREFERRED EMBODIMENTS

Figure 1:
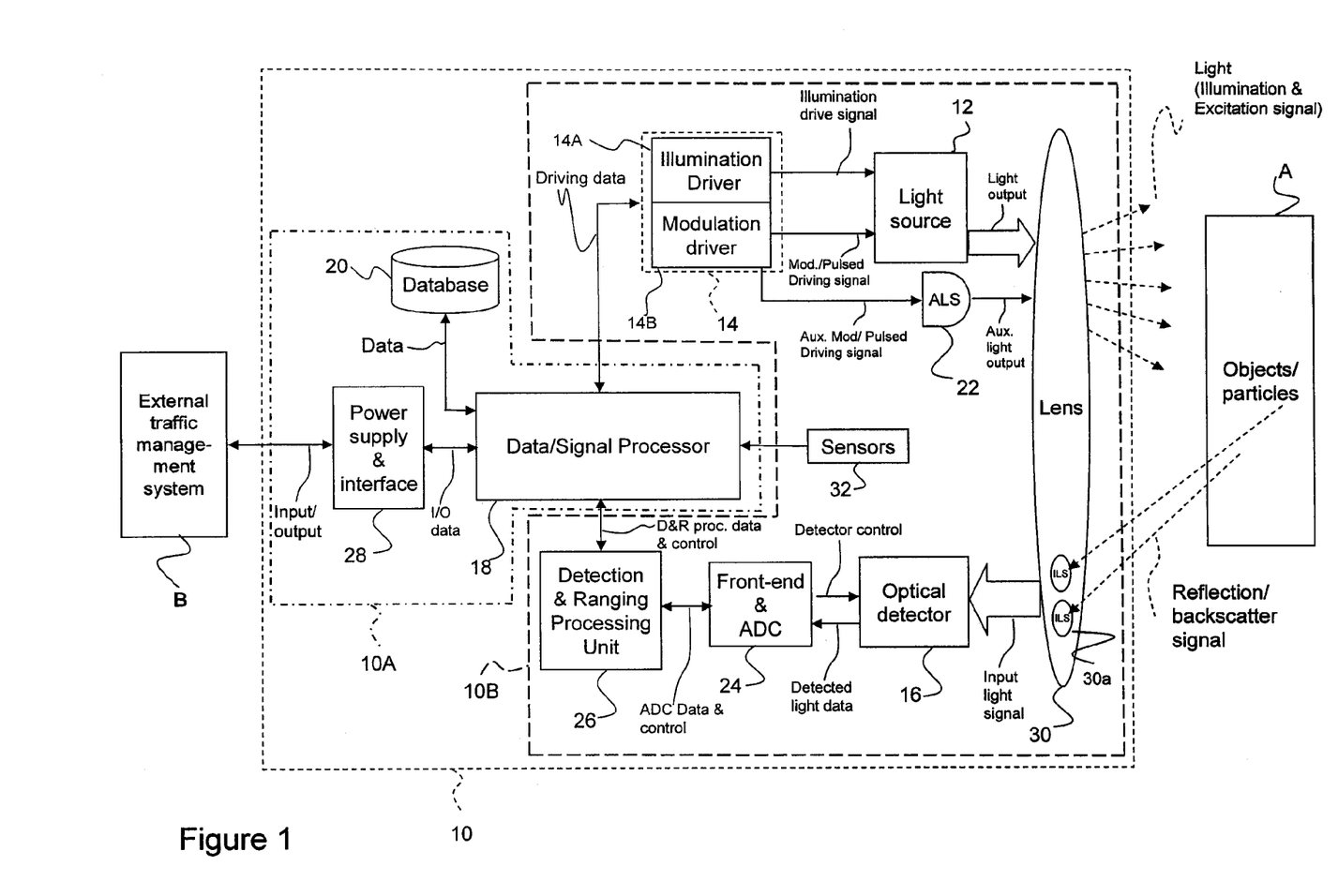
FIG. 1 is a block diagram illustrating a lighting system for traffic management.

Referring to FIG. 1, an example traffic-management lighting system is generally shown at 10. The lighting system 10 has a processing/driving unit 10A and a traffic light unit 10B. It is pointed out that more than one traffic light unit 10B may be used with a common processing/driving unit 10A.

The traffic light unit 10B has a light source 12. The visible-light source 12 has as a first function the emission of visible light for visual communication of information, like signalling, for human vision. Accordingly, the light source 12 emits the various light signals associated with a traffic light, such as emitting light of different colors (i.e., green, red, yellow), and in different shapes (e.g., circles, arrows).

This primary function of emitting light is controlled according to specific criteria like optical power, field of view and light color, to meet requirements defined through a number of regulations for traffic signal applications, and pedestrian control, amongst others. In this example embodiment, the visible-light source 12 has solid-state lighting devices, LEDs or OLEDs for instance, and may be is part of a traffic light unit, for car or for pedestrian signalling, to name a few applications. In one embodiment, the LEDs are regrouped to emit different traffic signals of different colors as required by traffic management signalling.

The visible-light source 12 is connected to a source controller 14, so as to be driven into producing visible light. In addition to emitting light, the system 10 performs detection of objects and particles (vehicle, pedestrian, airborne particles, gases and liquids) when these objects are part of the environment/scene illuminated by the light source 12. Accordingly, the source controller 14 drives the visible-light source 12 in a predetermined mode, such that the emitted light takes the form of a light signal, for instance by way of amplitude-modulated or pulsed light emission.

These light signals are such that they can be used to provide the lighting illumination level required by the application, through data/signal processor 18 and source controller 14, while producing a detectable signal. Accordingly, it is possible to obtain a light level equivalent to a continuous light source by modulating the light signal fast enough (e.g., frequency more than 100 Hz) to be generally imperceptible to the human eye and having an average light power equivalent to a continuous light source.

In an embodiment, the source controller 14 is designed to provide an illumination drive signal, such as a constant DC signal or a pulse-width modulated (PWM) signal, that is normally used in lighting systems to produce the required illumination and control its intensity. The illumination drive signal is produced by the illumination driver sub-module 14A of the controller 14.

The sub-module 14B emits a modulated/pulsed driving signal which supplies the fast modulation/pulse sequence used for remote, object detection. Using LEDs, the amplitude of short-pulse (typ. <50 ns) can be several time the nominal value (such as 20 times) while the duty cycle is low (typ. <0.1%). The modulator driver sub-module 14B is used to send data for remote optical detection.

Both the illumination drive signals and the modulated/pulsed driving signals can be produced independently or in combination. Sequencing of the drive signals is controlled by the data/signal processor 18. The light source 12 can be monitored and the resulting parameters sent to the data/signal processor 18 for optimization of data processing. For example, a match filter can be done between the light output signal or auxiliary light output signal and input light signal from the optical detector 16, as will be described hereinafter.

When a plurality of lighting systems 10 are used in a common environment, a signature modulation is considered. Random pulsing modulation can be used to discriminate each system.

The visible-light source 12 typically uses LEDs. More specifically, LEDs are well suited to be used in the lighting system 10 as LED intensity can be efficiently modulated/pulsed at suitable speed. Using this possibility, current traffic light units already installed and featuring LEDs for standard lighting applications can be used as the light source 12 for sensing applications. These applications include non-exclusively presence detection for energy savings, distance and speed measurements, fog, rain, snow or smoke detection, and spectroscopic measurements for gas emission or smog detection.

The detector 16, (or detectors 16) is an optical detector (or detectors) provided so as to collect light emitted by the light source 12 or auxiliary light source as described hereinafter and back-scattered by the objects/particles A. The light signal can also come from an object A being the direct source of this light (such as a remote control) in order to send information to the data/signal processor through the optical detector 16. The optical detector 16 is as an example any of photodiodes, avalanche photodiodes (APD), photomultipliers (PMT), cmos or CCD array sensors, amongst others.

Filters are typically provided with the detector 16 to control ambient light background emitted from sources other than the lighting system 10. Filters can also be used for spectroscopic measurements and to enhance performance of the light source 12. For instance, a pulsed visible-light signal from a white LED filtered to blue is faster as compared with an unfiltered light signal but has less power. In the case of white LEDs, the phosphor used converts the blue light of the LED junction into visible light with a certain of the phosphorescence emission lifetime.

In some applications, the blue part of the emission spectrum of white phosphorescent LEDs is used, with proper wavelength filtering at detection, to allow faster light modulation, since the blue part will not suffer the phosphorescent material usual modulation speed reduction. This would allow either faster modulation speeds or light pulses while keeping the broadband illumination of the white LED for the scene illumination. When the application is used to detect objects farther with less precision, the full bandwidth is more appropriate. With the same source, a combination of blue-filter detector and full-bandwidth phosphorescent LEDs detector can optimize the precision for short distance and long range detection. Many applications do not require the same precision for a longer range.

A database 20 may be provided in association with the data/signal processor 18 so as to provide historical data, or tabulated data to accelerate the calculation of the object parameters.

An additional light source for detection involves the auxiliary light source 22, a visible or non-visible source (e.g., UV or IR light, LEDs or laser) using the modulator driver 14B. The auxiliary light source 22 adds capabilities for detecting objects and particles, and may be used as a secondary light source to improve the detection performance or range, or to confirm the detection performed using the light source 12. UV light sources (particularly around 250 nm) can be used to limit the impact of the sunlight when used with a UV detector. IR light can be used to increase the performance and the range of the detection area. IR lights and other types of light can be used to detect several types of particles by selecting specific wavelengths. The auxiliary light source 22 can also be useful during the installation using as a pointer and distance meter reference.

A front-end and analog-to-digital converter (ADC) 24 is connected to detector 16 and receives detected light data therefrom and controls the detector 16. For instance, adjusting the $V_{bias}$ of an APD detector can be one of the detector controls to optimize the gain of the receiver section for an Automatic Gain Control (AGC).

A detection and ranging processing unit 26 is connected to the ADC 24, and controls parameters such as gain of amplifier, synchronization and sample rate of the ADC. The deflector and ranging processing unit 26 receives data from ADC and processes the data. Shift control for acquisition can improve accuracy with the same sample rate. For instance, a 20MSPS ADC can have an improved resolution if successive acquisitions are delayed by an equivalent fraction of the acquisition time period. Also, the rise time can be measured with enhanced precision. Averaging is another pre-process treatment to improve signal/noise ratio. Other techniques like a moving-average filter improve the performance. Match filter (input/output signals) improve the resolution. An object can also be locked and followed with FFT processing. A specific processing function can be used for each point of the trace. For instance, more sample can be averaged for a point which represents farther distance (trade-off between signal-to-noise ratio and number of results per second). Accordingly, some environmental/weather conditions like fog, snow, rain, dust (e.g., on the lens 30), fog to name a few, can be estimated. For example, this can be used to detect an obstruction of the traffic light by snow accumulated on the light source 12.

The data/signal processor 18 is connected to the detection and ranging processing unit 26, so as to receive the data pre-processed by the ADC 24 and the detection and ranging processing unit 26. The data/signal processor 18 is also connected to the source controller 14, so as to receive driving data therefrom. The data/signal processor 18 has a processing unit (e.g., CPU) so as to interpret the pre-processed data from the detection and ranging processing unit 26, in comparison with the driving data of the source controller 14, which provides information about the predetermined mode of emission of the light signals emitted by the visible-light source 12.

Accordingly, information about detected objects (e.g., presence, distance, speed of displacement, dimension) is calculated by the data/signal processor 18 as a function of the relation (e.g., phase difference, relative intensity, spectral content, time of flight, etc.) between the driving data and the detected light data, as optionally pre-processed by the front-end and ADC 24 and the detection and ranging processing unit 26.

In view of the calculation it performs, the data/signal processor 18 controls the source controller 14 and thus the light output of the visible-light source 12. For instance, the visible-light source 12 may be required to increase or reduce its intensity, or change the parameters of its output. For example, changes in its output power can adapt the lighting level required in daylight conditions versus nightlight conditions, or in bad visibility conditions such as fog, snow or rain.

The system 10 has a power supply and interface 28. The interface 28 is connected to the data/signal processor 18 and is in communication with the external traffic management system B (wireless, power line, Ethernet, CAN bus, etc.).

In the illustrated embodiment, the traffic light unit 10B has at least one lens 30 through which light is emitted in an appropriate way for traffic signalling, and/or pedestrian control. Input lens section 30a of the lens 30 is used for receiving the light signal, for instance reflected or diffused (i.e., backscattered) by the objects/particles A. This input lens section 30a can be at a single location or distributed (multiple zone elements) over the lens 30 and have at least one field of view. Several types of lenses 30 can be used, such as fresnel lenses, for instance. Sub-sections of the lens 30 can be used for infrared wavelength, or for optical data reception.

The data/signal processor 18 sends the calculation output to an external traffic management system B in such a way that the external system B acts upon the information provided by the data/signal processor 18 to control the traffic signal emitted by the traffic light, for instance by switching the traffic signal, or its state (e.g., ON, OFF, flashing). For instance, the external system B may be the processing unit of a traffic-light central controlling unit. The external system B can also give input parameters/commands to be used to the data/signal processor 18. These parameters can be adjustments to be performed to current calibration, new programs to be implemented for the current application, or data to be added to the database 20.

In an example, the traffic light unit 10B is adapted to emit at least two different signals, such as a green light, a red light and a yellow light. The external system B may eventually command a switching of the signal emitted by the traffic light unit 10B as a function of the detection of an object (e.g., its presence, its position), such as a car, as detected by the lighting system 10.

When used in traffic management, the external traffic management system B commands the lighting system 10 as a function of the presence of vehicles. For instance, in one embodiment, the external system B commands simultaneously the traffic light units 10B of an intersection as a function of the volume of vehicles. One of the traffic light units 10B may be kept in a green light state longer than other light units 10B if the street of that specific light unit 10B has more vehicles. Therefore, the external system B commands either one processing/driving unit 10A having a plurality of the traffic light units 10B, or a plurality of lighting systems 10.

In one embodiment, the traffic light unit 10B is the existing light module of a traffic light, in which the detector 16 is installed. The processing/driving unit 10A is located for example in the traffic light head or in the control box of the traffic light, accessible from the ground. This configuration allows the retrofitting of existing traffic lights into the lighting system 10. However, it is also considered to have both the processing/driving unit 10A and the traffic light unit 10B positioned in the existing light module.

The system 10 has sensors 32 connected to the data/signal processor 18. Sensors 32 are composed with an inclinometer, accelerometer, and/or temperature sensor, day/night sensor, digital compass to name a few type of sensors. Those sensors 32 are useful during the installation and during operation. For instance, data from an inclinometer and accelerometer are useful to compensate for the impact on the field of view by the effect of the wind or any kind of vibration, or to adjust or correct a position and/or an orientation of the traffic light unit 10B, in view of vibrations from wind, or from the traffic, etc. Temperature sensors are useful to provide information about weather (internal, external or remote temperature with FIR lens). Information from sensors 32 and data/signal processor 18 and light from light source 12 and auxiliary light source 22 can be useful during installation, in particular for adjusting the field of view of the optical receiver. The auxiliary light source 22 can be used as a pointer and distance meter The configuration of the detector 16 and of the data/signal processor 18 is dependent on the application's requirements. One difficulty in many applications is to obtain an appropriate distance measurement when multiple objects are located at different positions within the fields of view of both the light source 12 and the optical detector 16. In such a case, each object in the field of view will contribute to the final distance value, weighed according to its real distance and reflectivity. One of the ways to get around this issue is to restrict the field of view of the detector(s), which limits the volume of space being probed. Detector configurations are arranged according to the specifications required from the application.

Figure 2A:
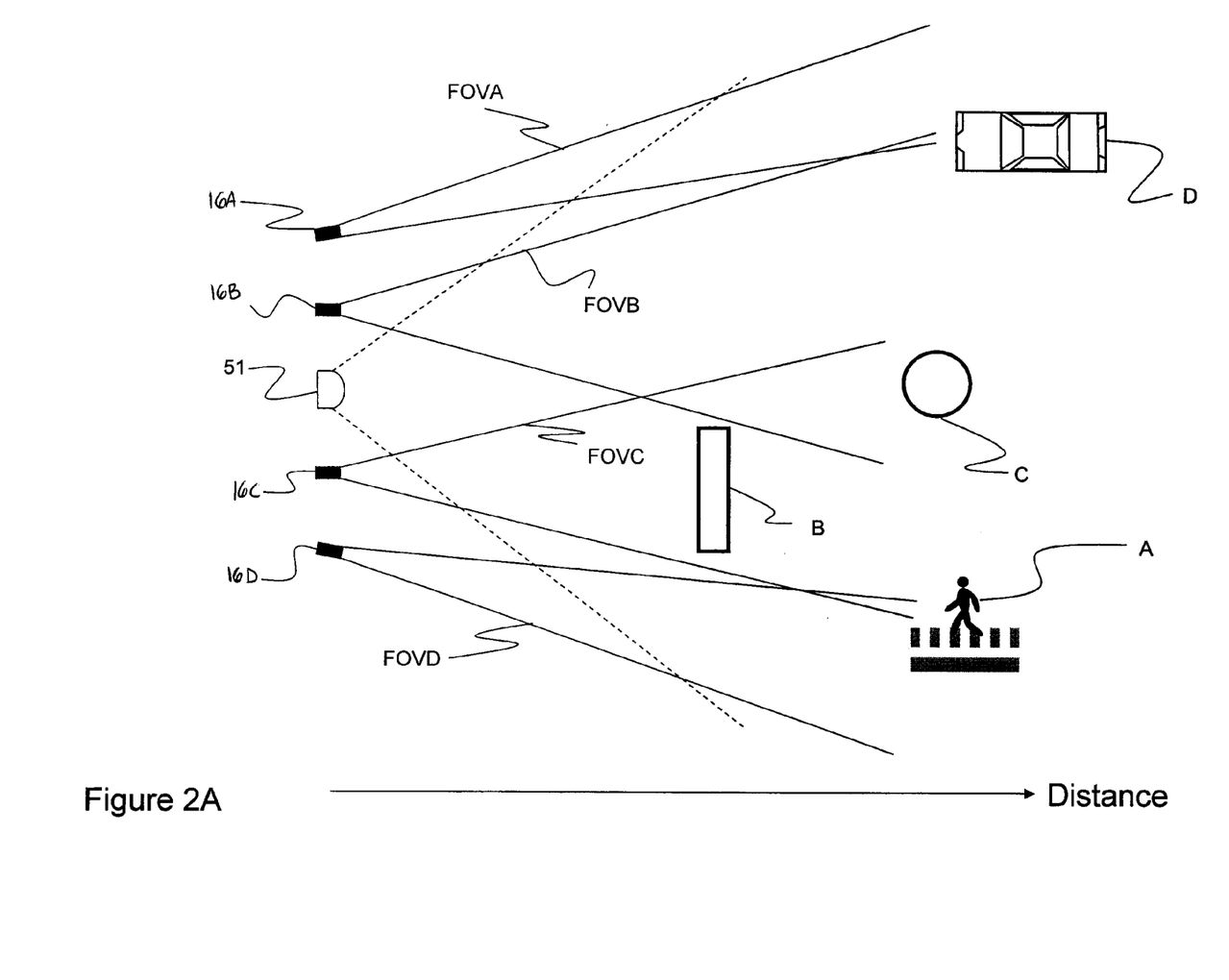
FIG. 2A is a schematic view of a detector configuration for the lighting system of FIG. 1, with multiple detectors.

In an alternative embodiment (FIGS. 2A and 2B), a sensor configuration involves a plurality of discrete detectors, each observing a respective fixed field of view (FOVA through FOVD) within a volume of space illuminated by the light source 51 (i.e., that corresponds to the light source 12 in the traffic light unit 10B) and comprising several objects (A to D). Fields of view of the detectors 16 are narrow or might be a combination of narrow and wide field of views as a trade-off between distance accuracy and number of necessary detectors. The optical detectors 16A-16D are an example any of photodiodes, APD, PMT or cmos array. In traffic management applications, the optical field of views may be oriented so as to monitor lanes of the streets, to anticipate the presence of vehicles at an intersection, so as to provide information used to control the actuation of the traffic light units 10B. It is noted that the number of detectors 16A-16D may vary.

Figure 2B:
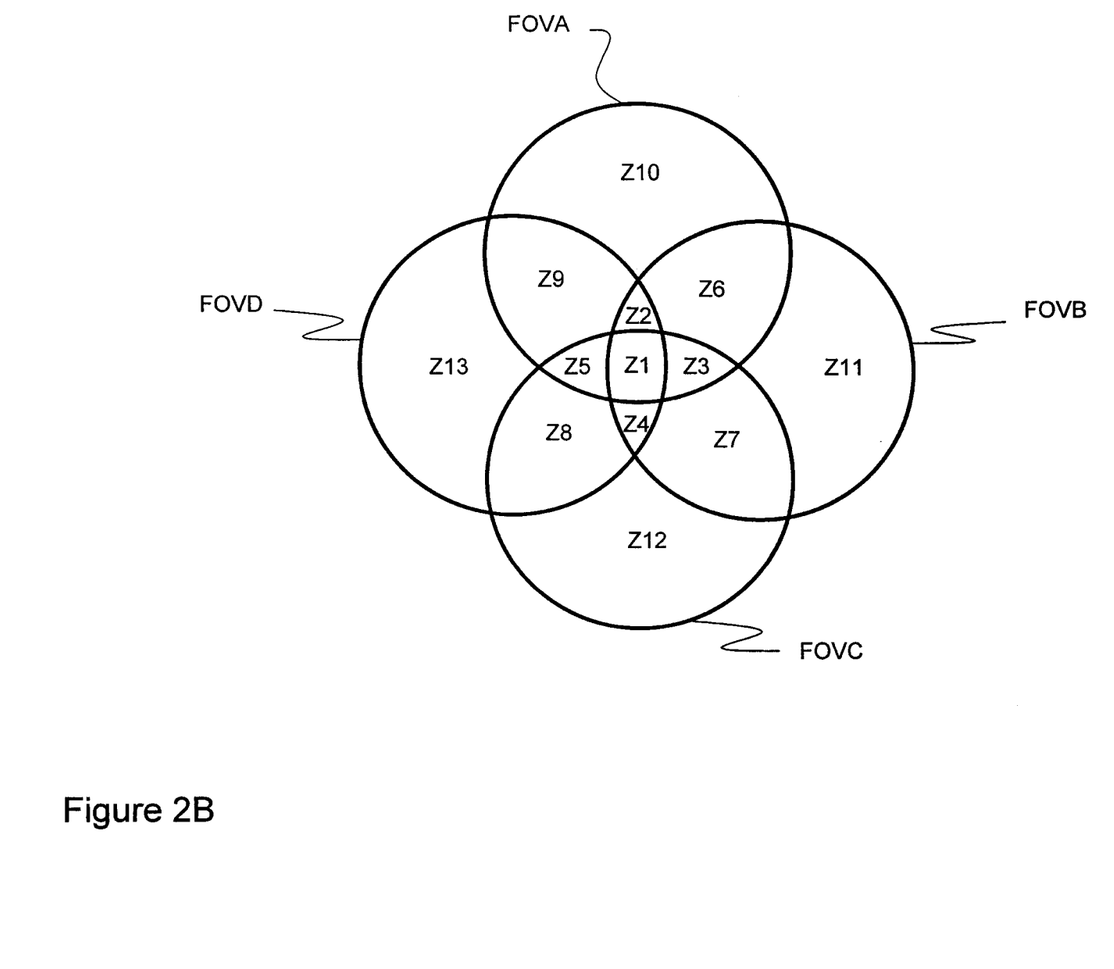
FIG. 2B is a schematic view of overlapping detection zones obtained using the detector configuration of FIG. 2A.

Referring to FIG. 2B, an overlap of the fields of view FOVA to FOVA is illustrated, and shows zones Z1 to Z13 resulting from the overlap. Accordingly, the plurality of fields of view can be used to create different zones that will give additional information as to the position of an object.

Figure 3A:
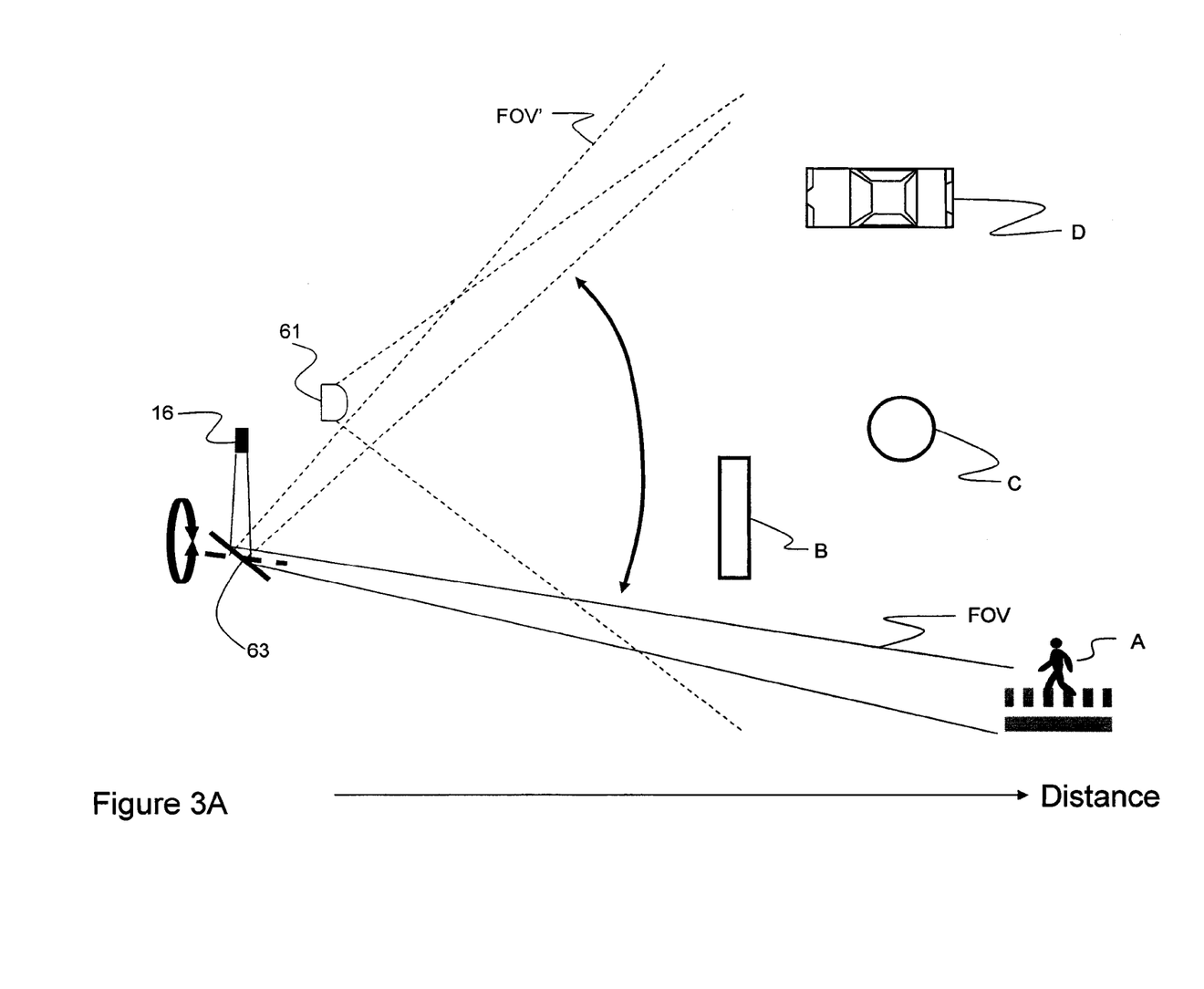
FIG. 3A is a schematic view of an alternative detector configuration for the lighting system of FIG. 1, with a scanning mechanism.
Figure 3B:
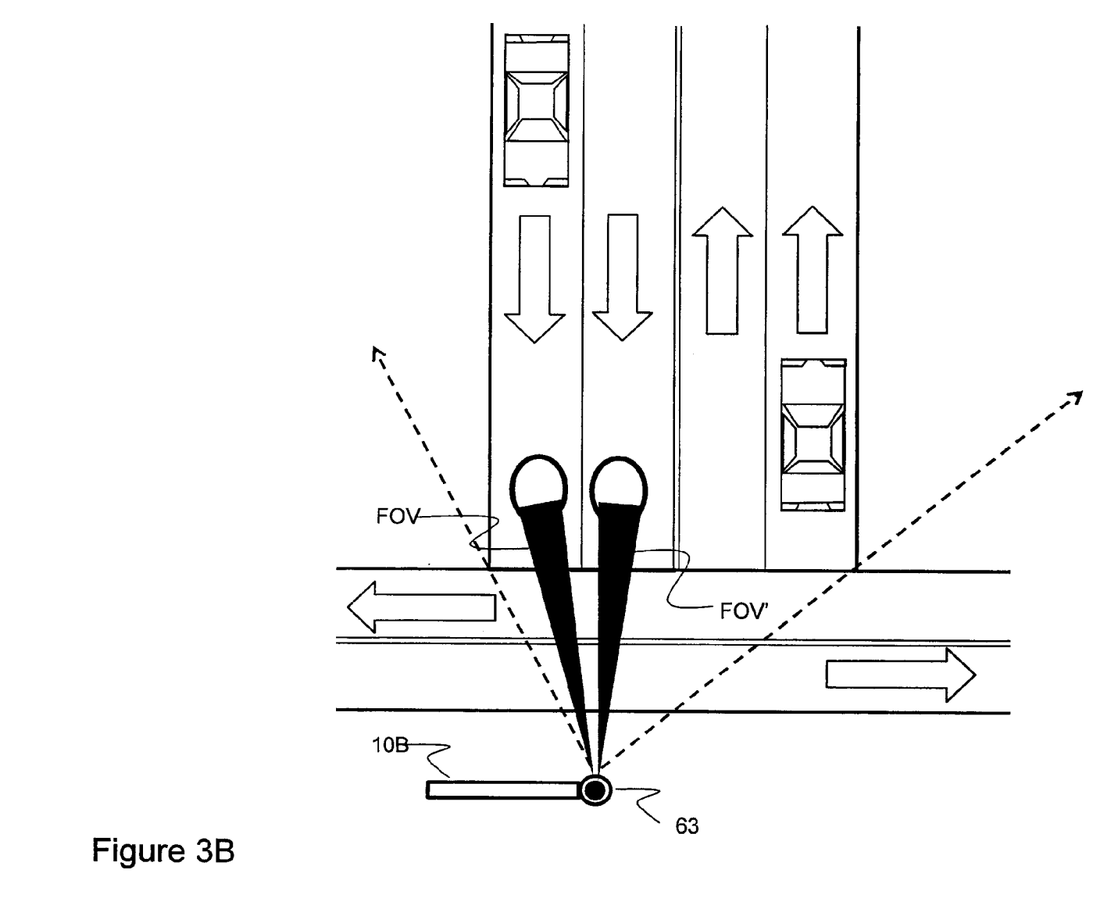
FIG. 3B is a schematic view of the detector configuration of FIG. 3A, in a road application.

In another alternative embodiment, a sensor configuration is depicted in FIGS. 3A and 3B. In this case, the light source 61 (i.e., that corresponds to the light source 12 in the traffic light unit 10B) illuminates the same scene enclosing objects A through D, but typically one discrete detector 16 having a narrow field of view FOV is used in combination with a scanning mechanism 63. The scanning mechanism 63 changes the portion of the illuminated volume being probed by the detector, in essence changing the field of view FOV to FOV'. Again, detector 16 might be any of a photodiode, an APD, a PMT or equivalent thereof. This configuration minimizes the number of components but requires sequential probing of the illuminated volume and the use of a mobile part in the scanning mechanism 63. Moreover, a motion of the scanning mechanism 63 must be actuated and monitored by the data/signal processor 18 as the orientation of the scanning mechanism 63 will have an effect on the calculation of the position of the objects. Referring to FIG. 3B, the sensor configuration with the scanning mechanism 63 is illustrated detecting the presence of vehicles on the road.

Figure 4:
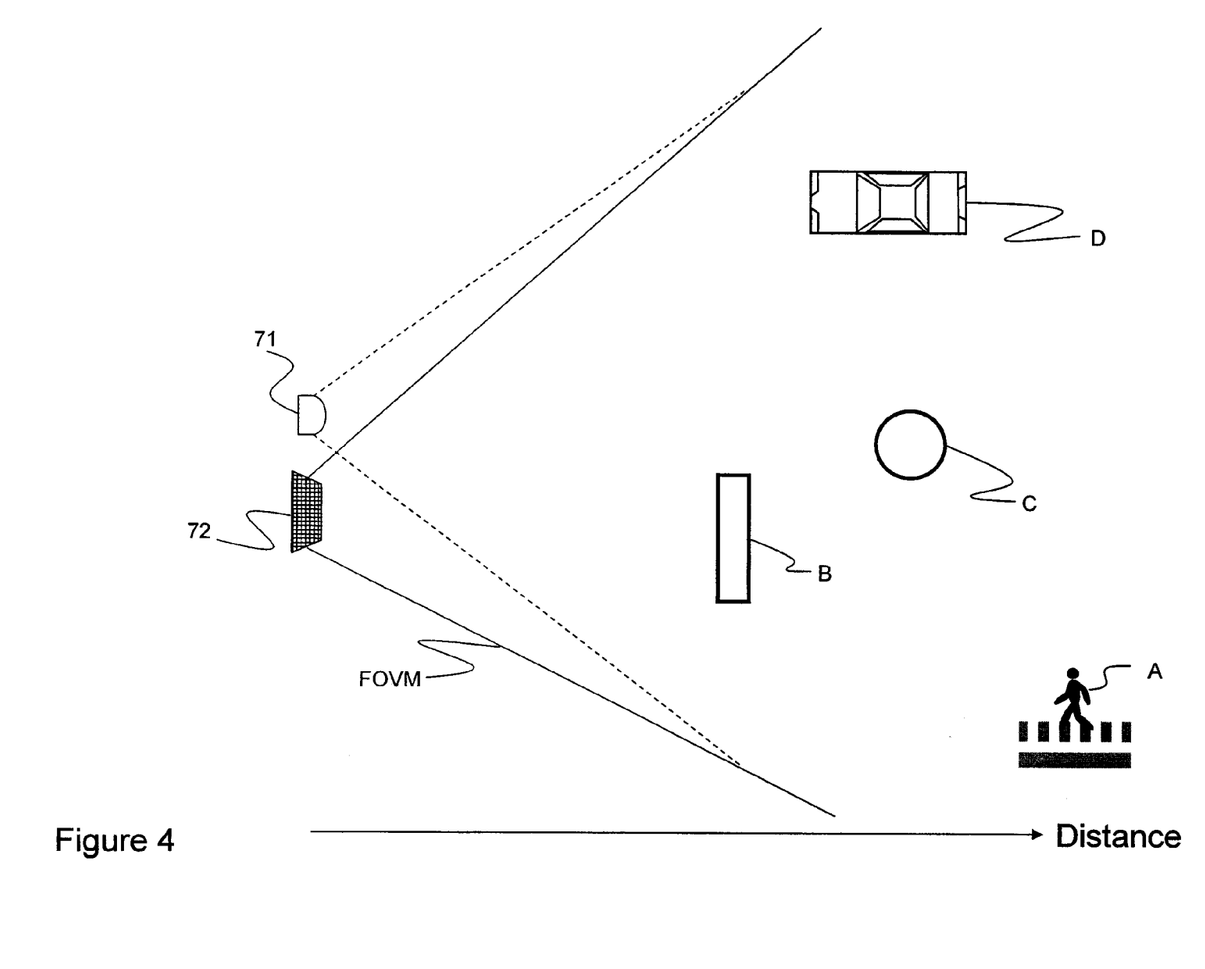
FIG. 4 is a schematic view of an alternative sensor configuration for the object-detecting lighting system of FIG. 1, with a detector array.

In another alternative embodiment, illustrated in FIG. 4, a detection array 72 (i.e., that corresponds to the detector 16 in the traffic light unit 10B) is used with a large field of view FOVM encompassing the whole illuminated scene as illuminated by light source 71 (i.e., that corresponds to the light source 12 in the traffic light unit 10B). Each pixel of the array 72 acts as a discrete detector with a very narrow field of view and probes a specific portion of the illuminated scene, as determined by any secondary optics in front of the array. The array 72 is any linear or 2D-type array, such as APD or photodiode arrays, CCD and CMOS sensors. CMOS sensors with fast electronic shutter are particularly efficient.

Figure 5:
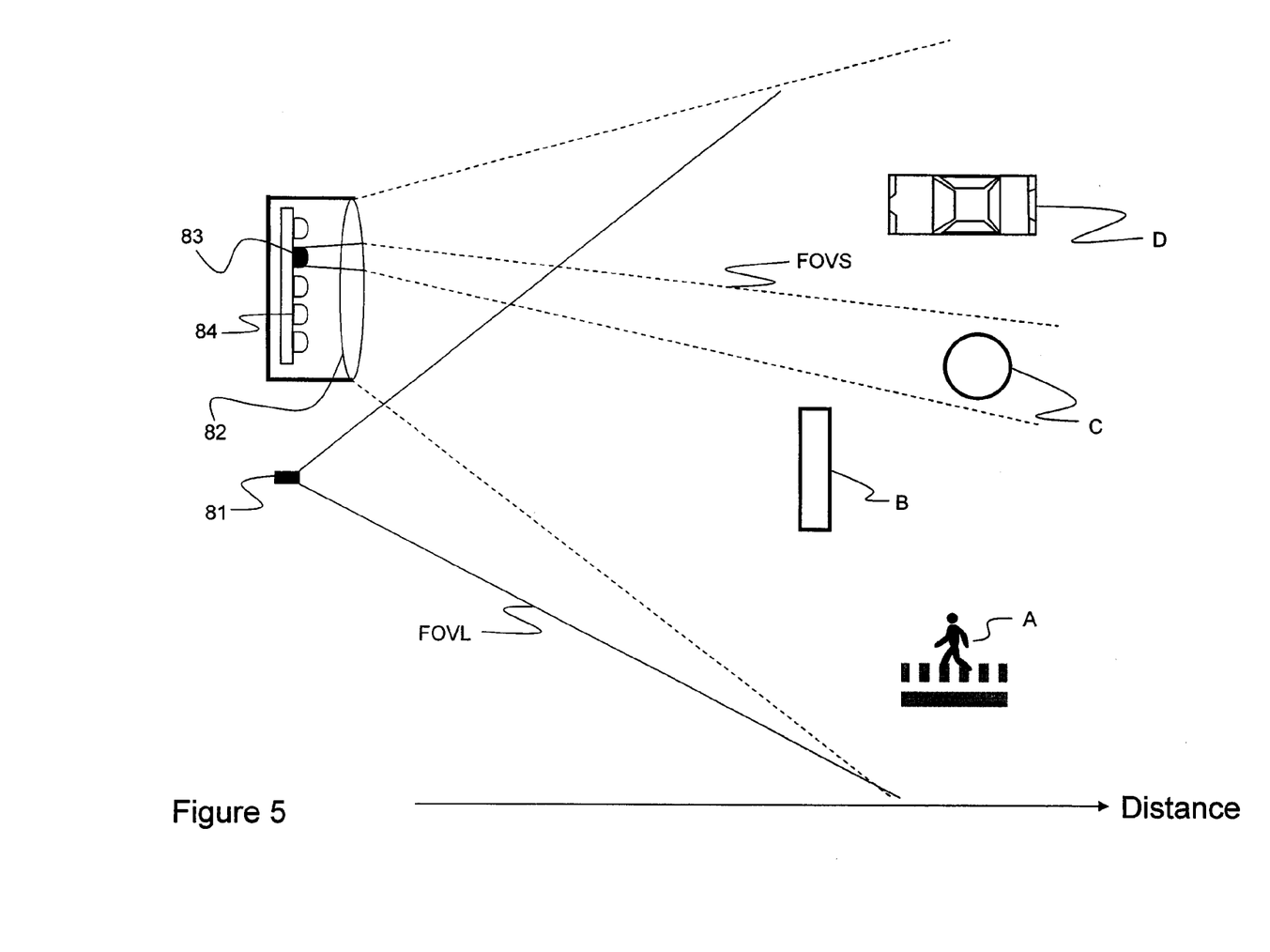
FIG. 5 is a schematic view of an alternative sensor configuration for the object-detecting lighting system of FIG. 1, using a light source array.

Another alternative embodiment presented in FIG. 5 transfers to the source side the need to select a field of detection from within the field of illumination. In this embodiment, the light source is composed of multiple individual lighting elements (e.g., LEDs or small clusters of LEDs) that are driven together by the illumination drive signal (without modulation), providing constant illumination of the scene. A lens 82 is used to alter the emitted light, and sensor 81 detects the input light signal.

Using a sequencing component within the source controller, each lighting element 83,84 can be switched in turn from the illumination signal only to the modulated signal (or a combination of both illumination and modulation drive signals) required by the predetermined driving mode for a specific duration in a cycle. The modulated light element 83 illuminates only a portion of the scene with a narrow field of view FOVS, as determined by the appropriately designed secondary optics, while the other elements (e.g., 84) are fed by the illumination drive signal only, illuminating the rest of the scene without modulation.

After the specified duration, another element (e.g., 84) is switched to modulated mode and the initial element 83 falls back to the illumination drive signal only. This operation is repeated according to programming of the data/signal processor 18, which controls drive sequencing (as shown in FIG. 1). In essence, the modulated or pulsed light emission is being scanned in discrete steps in the illuminated spatial volume.

In such a configuration, discrete detector 81 with a large field of view FOVL encompassing the entire illuminated scene will be sensitive only to objects within FOVS. The discrete detector 81 may be any of a photodiode, an APD, a PMT or equivalent thereof. This configuration is well adapted for applications where the light source is or can be a group of lighting elements and simplifies the detection stage design, at the price of possible lower brightness of the modulated or pulsed source, more sophisticated design of the secondary source optics and sequential probing of the spatial volume of interest.

Figure 6:
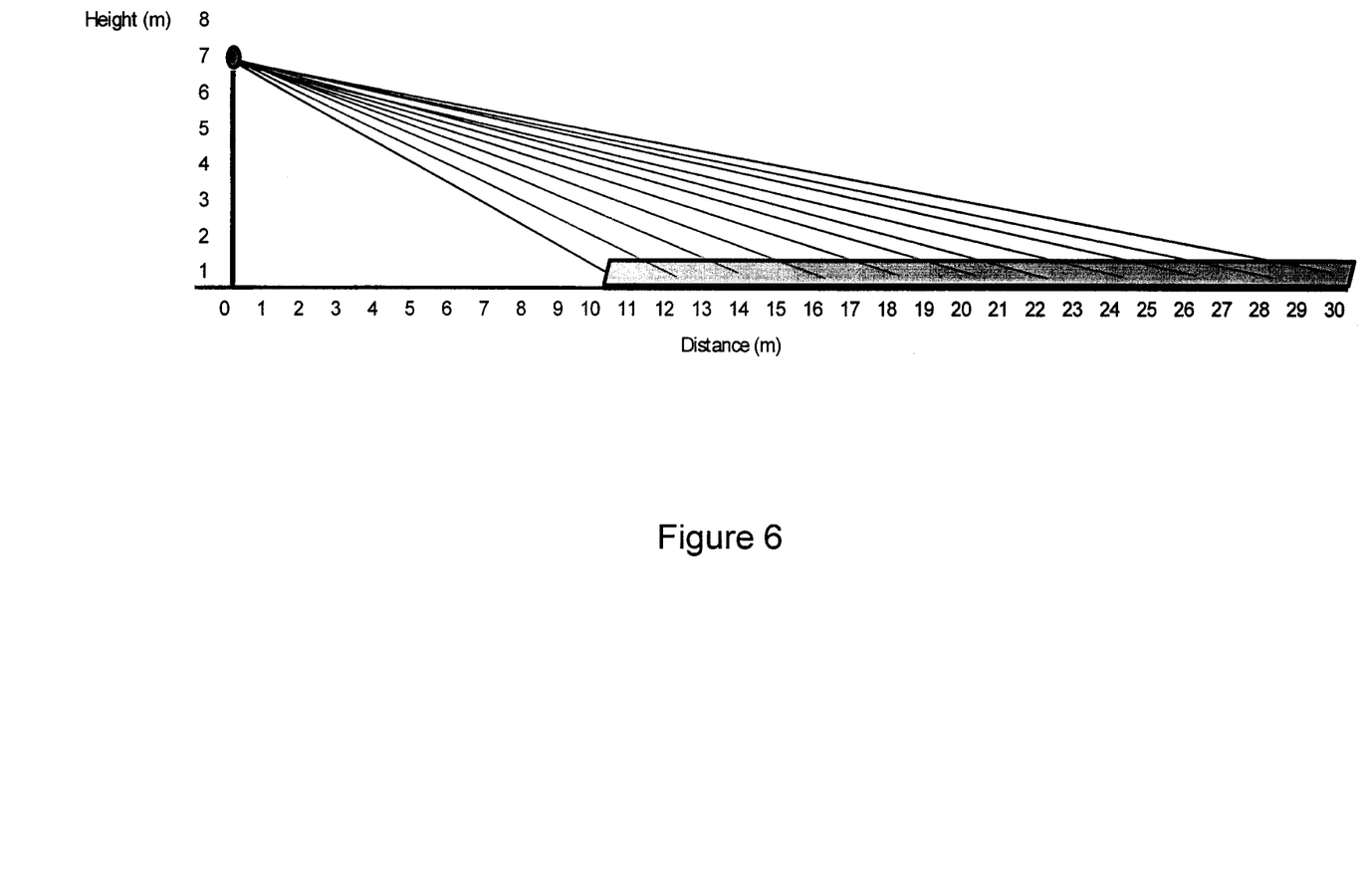
FIG. 6 is a schematic view a calibration of the lighting system of FIG. 1.

In FIG. 6, there is illustrated a calibration of the lighting system 10. In such calibration, the limits of the field of view of the detector 16 are associated with a distance from the traffic light unit 10B, so as to calibrate the detector 16. As an example, information may be entered using a user interface of the data/signal processor 18. The calibration is used to ensure that the lighting system 10 covers a desired region, for instance by adjusting the coverage to the width of the road. Moreover, the calibration will ensure that the position of the stop lines are known, as the actions of the lighting system 10 may have an effect on the stopping of vehicles.

The system 10 can be used as a road weather information system (RWIS) and thus provide information about temperature, visibility (fog, snow, rain), condition of the road (icy) and pollution (smog). The system 10 can be used to adjust the intensity of light depending on weather conditions.

Traffic lights are lighting applications that currently use LEDs as a light source. In this case, the increased irradiance, lifetime, switching time and efficiency are beneficial to the application. In this latter case, an improvement would be to add the features of the lighting system 10 to these lights by designing/retrofitting the lights with the various components of the lighting system 10, rather than to use inductive or capacitive sensors placed into the ground under the road pavement.

In the case of prior art traffic lights with detection capabilities, sensors are placed under the pavement. Then, when a vehicle arrives at road crossings, it is detected (by electrical induction or capacitive sensing) and the traffic lights are activated with predetermined timing settings. However, to place these sensors under the pavement requires excavation work to be performed for each road crossing.

With such sensors, the detection occurs only at the level of the sensors, so the speed and the number of cars cannot readily be estimated. The features of the lighting system 10 would allow further intelligence to be implemented into the traffic light systems, and thus more possibility of lowering the risk of car accidents.

Figure 7:
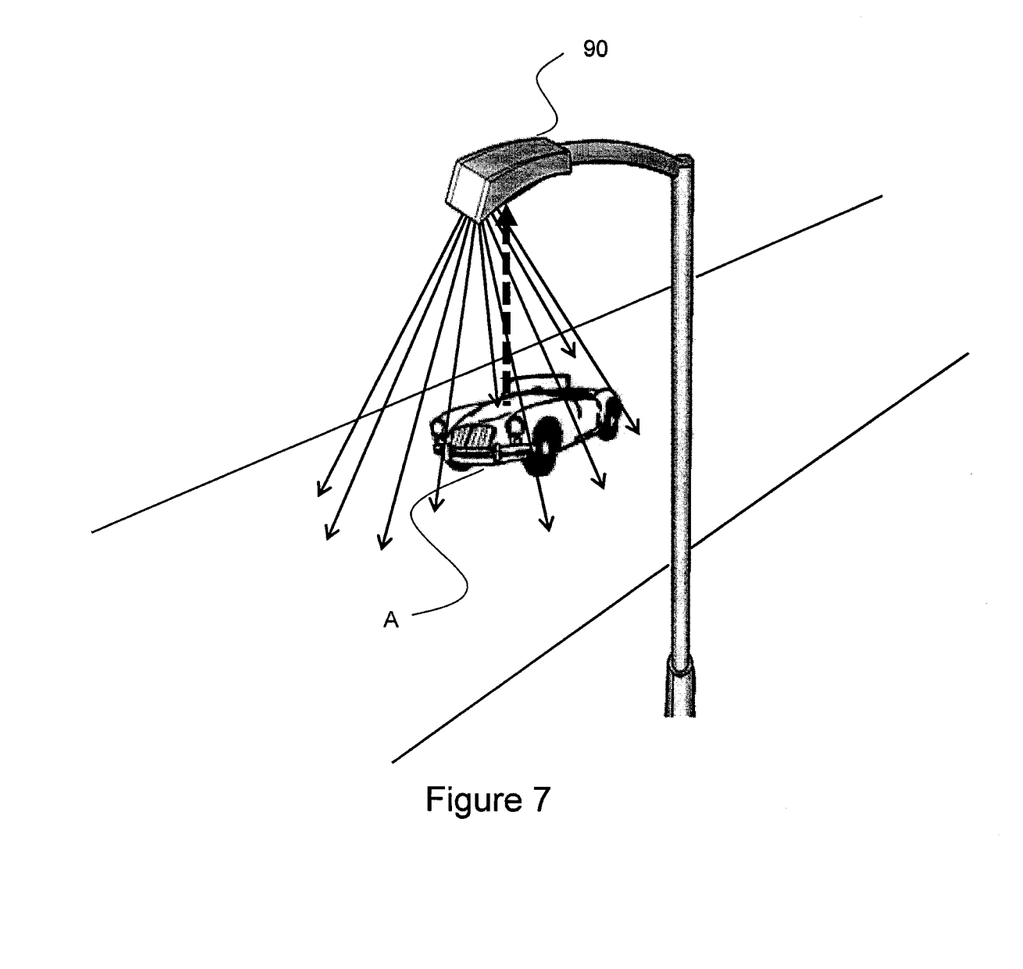
FIG. 7 is a schematic view of a street light of the lighting system of FIG. 1 detecting a vehicle.

Using an optical detector to detect cars beneath, within or adjacent to the traffic light units 10B, as proposed by the lighting system 10, would allow cost-efficient detection, since the pavement would not need to be removed to put the detector into place. Moreover, it is considered to combine the detection of a street light (or other lighting system) to a signaling action with a traffic light. Referring to FIG. 7, a street light 90 is shown, and incorporates the components of the lighting system 10 of FIG. 1. As such, the street light 90 is adapted to detect the presence of objects, such as vehicles as is illustrated in FIG. 7.

Therefore, upon detecting a vehicle, the street light 90 signals the detection to the external system B (FIG. 1). The external system B forwards the information or commands to an appropriate traffic light, to control the emission of signals.

Maintenance and repairs would also be less costly. Furthermore, using multiple detectors having different fields of view would allow detection of many vehicles at the same time, as well as evaluation of their speed in the same lane or in separate lanes, making it a useful tool for traffic measurement and control.

The speed of the vehicles could also be measured with the modulation phase shift measurement (or time of flight of pulsed light with continuous detection signal) technique described previously.

The visibility changes in different weather conditions could also be measured. In fact, the yellow signal lights seen along roads in the vicinity of rivers to signal poor visibility conditions caused by fog could be used as visible-light sources that would allow such visibility to be measured with proper detection. The lighting system 10 could be used to detect an encoded light source placed on emergency vehicles (that could be the vehicle emergency lights themselves if based on LEDs) having a specific modulation scheme allowing a signal to be sent to the traffic lights to make them turn green in their favor. The optical detector 16 of the lighting system 10 can be used to detect an encoded incoming light signal from external (or other) light sources such as a remote control that would allow communication in order to control, calibrate or configure the lighting unit for the current location and usage requirements.

The measurement of vehicle speed is also possible either by distance measurement or by measurement of their time of passage at different points along the street lane beneath the LED street-lighting devices. This makes possible gathering of information that would not otherwise be possible, without installing special devices or sensors.

It is considered to implement spectroscopic detection at two (or more) different wavelengths of gas emission from vehicles or other sources in the vicinity of the streetlights (for homeland security issues). The different wavelengths would then allow detection (with two detectors detecting different wavelengths) of a difference in signals from either different absorption or diffusion levels from gases. Here again, the visibility changes in different weather conditions could also be measured.

For luminaires or streetlights based on LEDs, the same type of possibility could be implemented, through the use of already installed lighting, allowing the detection of the presence of individuals or vehicles beneath the lights in order to control the light level accordingly. When no circulation is detected, the light level can be lowered to decrease the energy required.

In fact, traffic light units 10B streetlights, rail lights, and parking meters equipped with the detection capabilities provided by the lighting system 10 could be the base of a network allowing to manage traffic and vehicle circulation inside cities and emergency situations having impacts on traffic. This could be made possible by putting their data/signal processing units 18 in communication with a central external traffic managing system (i.e., external system B of FIG. 1) through RF links or through power lines.

Energy consumption is an increasing concern because of the rising costs of energy. Efficient street lighting power consumption, and thus energy budgets of cities, will benefit from LEDs when they reach this application. Controlling the light level is readily achieved with LEDs compared to current sodium luminaires which have a restrike time in the order of minutes. Thus, with LEDs it becomes feasible to control streetlight level when no civilians are circulating under these lights, and this also allows energy savings.

Current street-lighting systems do not allow the adjustment of light level on demand which would readily be performed using the lighting system 10. Such adjustment capability would allow a decrease in their energy consumption. For example, sodium lights can hardly be adjusted in intensity. Usually, no detection systems are present, or they are based on movement detection sensors, which are usually based on infrared detectors that can hardly detect moving people or vehicles at hot ambient temperatures or people covered in winter clothes in cold weather.

Furthermore, such detectors work better at short range and with a limited field of view and, since many streetlights are placed on long posts, they would suffer many calibration problems for that application. Even if streetlights were to show characteristics allowing them to be adjusted in intensity on demand, this would probably be one reason why such detectors would not be placed on streetlights. An adapted detector would need to cover a large field of view, not being sensitive only to heat difference, but being sensitive enough inside the field of view to detect as well pedestrians and trucks. Finally, it would also need to be technologically available and integrated at low costs.

Lighting system with traffic management capabilities offer the possibility of providing the typical information for a management system (Count, speed, presence, occupancy, classification) and road weather information (visibility in bad weather could also be estimated through light-diffusion measurements on snow, fog, dust or rain). Police or governmental vehicles could even be equipped with more capable detection systems to detect cars with bad gas emissions causing pollution problems.

Other applications are tunnel lighting (energy saving), traffic sign with lighting device, stop sign for instance (warming signal).

The invention claimed is:

1. A method for controlling traffic signaling as a function of a detection of an object, said object being one of a vehicle, an automobile, a truck, a pedestrian, a particle, an airborne particle, a gas, a liquid and a user of a traffic light, the method comprising:

providing said traffic light with a visible-light source emitting visible light and having a function of actuating alternately at least two different traffic signal states for traffic signaling;
driving the visible-light source to emit light in a traffic signal state in a predetermined mode in a field of illumination, with visible light in the predetermined mode being emitted so as to be visible to an unaided human eye;
receiving a reflection/backscatter of the emitted visible light from said object located in said field of illumination;
identifying at least one of a presence and a position of the object as a function of the reflection/backscatter received and of the predetermined mode; and
controlling said traffic signal states actuated by the visible-light source as a function of the at least one of the presence and the position of the object.

2. The method according to claim 1, further comprising retrofitting an existing traffic light with a source controller for driving the visible-light source and a detector for receiving the reflection/backscatter of the emitted visible light from the object.

3. The method according to claim 1, wherein driving the visible-light source in the predetermined mode comprises at least one of pulsating and modulating the visible light.

4. The method according to claim 1, wherein receiving the reflection/backscatter comprises filtering given light wavelengths.

5. The method according to claim 1, wherein identifying at least one of a presence and a position of the object comprises calculating at least a distance of the object by measuring a time delay between emitting the visible light and receiving the reflection/backscatter from the object.

6. The method according to claim 5, wherein calculating the distance comprises continuously calculating the distance so as to calculate a speed of the object.

7. The method according to claim 1, further comprising: providing an auxiliary light source in association with the traffic light; driving the auxiliary light source concurrently with the visible-light source in another predetermined mode to emit auxiliary light in an auxiliary field of illumination; receiving a reflection/backscatter of the auxiliary light from said object located in said auxiliary field of illumination; identifying at least one of the presence and the position of the object as a function of at least the reflection/backscatter received from the auxiliary light and the predetermined modes; and controlling said signal states actuated by the visible-light source as a function of at least one of the presence and the position of the object.

8. The method according to claim 7 wherein driving the auxiliary light source comprises driving the auxiliary light source into emitting light non-visible to an unaided human eye.

9. The method according to claim 1, wherein driving the visible-light source to emit visible light in a predetermined mode comprises pulsating a light emission diode to produce light pulses having a width of less than 50 ns.

10. The method according to claim 1, wherein controlling said traffic signal states comprises switching said traffic signal states as a function of the at least one of the presence and the position of the object.

11. A traffic-signal lighting system for controlling traffic signaling as a function of a detection of an object, said object being one of a vehicle, an automobile, a truck, a pedestrian, a particle, an airborne particle, a gas, a liquid and a user of a traffic light, the system comprising:

a light source emitting visible light and having a function of emitting visible light in an illumination mode for actuation alternately at least two traffic signal states;

a source controller for driving the light source into emitting one of the traffic signal states in a predetermined mode in a field of illumination, with visible light in the predetermined mode being emitted such that the light source maintains said function of emitting traffic signals visible to an unaided human eye in the environment while being driven by the source controller;

an optical detector adapted to detect the visible light as reflected/backscattered by said object located in said field of illumination to produce detection data; and a data/signal processor for receiving detection data from the optical detector, the data/signal processor producing a data output associated to the object as a function of the predetermined mode and the detection data, and for commanding the light source into controlling said traffic signal states as a function of the data output.

12. The traffic-signal lighting system according to claim 11, further comprising an external traffic-management system connected to the data/signal processor for managing traffic as a function of the detection data received from the data/signal processor.

13. The traffic-signal lighting system according to claim 11, wherein the optical detector comprises a plurality of sub-detectors each detecting a specific zone.

14. The traffic-signal lighting system according to claim 11, further comprising a scanning mechanism in association with the optical detector so as to cause a scanning motion of a field of view of the optical detector within a range of illumination of emitted light of the light sources.

15. The traffic-signal lighting system according to claim 11, wherein the optical detector has an array of sub-detectors.

16. The traffic-signal lighting system according to claim 11, wherein the source controller comprises a pulse/modulation driver to drive the visible-light source in the predetermined mode.

17. The traffic-signal lighting system according to claim 11, wherein the source controller comprises an illumination driver to drive the light source into emitting light of suitable intensity to illuminate an environment.

18. The traffic-signal lighting system according to claim 16, wherein the light source has a plurality of lights, with at least one of the lights of the light source being driven by the illumination driver to illuminate the environment, while at least another one of the lights of the light source is driven by the pulse/modulation driver to emit the visible light in the predetermined mode.

19. The traffic-signal lighting system according to claim 11, wherein the optical detector has a filtering device to filter given light wavelengths of the reflected/backscattered visible light.

20. The traffic-signal lighting system according to claim 11, further comprising an auxiliary light source for emitting an auxiliary light in another predetermined mode concurrently with the visible-light source, the reflection/backscatter of the auxiliary light received from an object being used to produce said a data output associated to the object.

21. The traffic-signal lighting system according to claim 20, wherein the auxiliary light source comprises a non-visible light source.

22. The traffic-signal lighting system according to claim 11, wherein said light source comprises a light emitting diode light source.

23. The traffic-signal lighting system according to claim 11, wherein the data/signal processor commands the light source into switching said traffic signal states as a function of the data output.

* * * * *